(12) United States Patent
Caliendo

(10) Patent No.: US 12,025,082 B2
(45) Date of Patent: Jul. 2, 2024

(54) AIR PRE-CLEANER SPIN TUBE

(71) Applicant: Caterpillar Inc., Peoria, IL (US)

(72) Inventor: Vincent P. Caliendo, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 13 days.

(21) Appl. No.: 17/558,772

(22) Filed: Dec. 22, 2021

(65) Prior Publication Data

US 2023/0193863 A1  Jun. 22, 2023

(51) Int. Cl.
| | | |
|---|---|---|
| F02M 35/10 | (2006.01) | |
| F02M 35/02 | (2006.01) | |
| F02M 35/022 | (2006.01) | |
| F02M 35/04 | (2006.01) | |

(52) U.S. Cl.
CPC .. F02M 35/10262 (2013.01); F02M 35/0223 (2013.01); F02M 35/044 (2013.01); F02M 35/10118 (2013.01); F02M 35/10144 (2013.01)

(58) Field of Classification Search
CPC ....... F02M 35/02–09; F02M 35/10262; F02M 35/10118; B01D 45/00; B01D 45/12; B01D 45/16
USPC ......................................................... 123/306
See application file for complete search history.

(56) References Cited

U.S. PATENT DOCUMENTS

| | | | |
|---|---|---|---|
| 3,448,563 A | 6/1969 | Sobeck | |
| 3,517,821 A | 6/1970 | Monson et al. | |
| 3,915,679 A | 10/1975 | Roach et al. | |
| 4,008,059 A | 2/1977 | Monson et al. | |
| 4,976,748 A * | 12/1990 | Prinsloo | B04C 3/06 95/269 |
| 6,726,735 B1 * | 4/2004 | Oussoren | B01D 46/521 210/473 |
| 7,048,783 B2 * | 5/2006 | Ponjican | B04C 5/04 55/447 |
| 10,695,775 B1 * | 6/2020 | Hedrick | B04C 3/00 |
| 2003/0033791 A1 | 2/2003 | Elliott | |
| 2009/0158932 A1 * | 6/2009 | Arnold | B04C 5/081 95/271 |
| 2009/0314161 A1 * | 12/2009 | Al-Alusi | B04C 11/00 95/271 |
| 2019/0321834 A1 * | 10/2019 | Chen | B04C 5/103 |
| 2020/0353394 A1 * | 11/2020 | Chen | B01D 45/14 |
| 2021/0079522 A1 * | 3/2021 | Wu | B01D 45/12 |

FOREIGN PATENT DOCUMENTS

| | | |
|---|---|---|
| EP | 0344750 | 12/1989 |
| EP | 1208901 A1 | 5/2002 |

OTHER PUBLICATIONS

Written Opinion and International Search Report for Int'l. Patent Appln. No. PCT/US2022/080975, dated Mar. 22, 2023 (9 pgs).

* cited by examiner

*Primary Examiner* — John Kwon
*Assistant Examiner* — Johnny H Hoang

(57) ABSTRACT

An air pre-cleaner spin tube includes a vaned inlet section including an inlet flange, and an outer tube inlet portion including an outer wall forming a nozzle that defines a radial direction, and a longitudinal axis. Also, a central stem is disposed in the nozzle, and a plurality of vanes extends from the central stem to the outer wall.

20 Claims, 10 Drawing Sheets

| SPIN TUBE FEATURES LIST | | |
|---|---|---|
| FEATURE | NOMINAL DIMENSION | RANGE |
| FACE TO FACE AXIAL HEIGHT (mm) | 90.5 | ±3.0 |
| PREDETERMINED AXIAL DISTANCE (mm) | 29 | ±2.0 |
| BASE EXIT RADIUS (mm) | 0.25 | ±.1 |
| INLET SLEEVE AXIAL HEIGHT (mm) | 2.0 | ±1.0 |
| INLET SLEEVE RADIUS (mm) | 1.0 | ±.1 |
| VANED INLET SECTION | | |
| INLET ID (mm) | 31.0 | ±2.0 |
| STEM INLET OD (mm) | 14.5 | ±2.0 |
| STEM OUTLET OD (mm) | 13.5 | ±2.0 |
| VANE PITCH (mm) | 55.5 | ±5.0 |
| NUMBER OF VANES | 3 | ±1 |
| VANED AXIAL DISTANCE (mm) | 32.0 | ±2.0 |
| MINIMUM OUTER TUBE INNER DIAMETER (mm) | 30.0 | ±2.0 |
| DIFFUSER MIDSECTION | | |
| OUTLET ID (mm) | 34.0 | ±2.0 |
| VENT HEIGHT (mm) | 22.5 | ±2.0 |
| MINIMUM ID (mm) | 30.0 | ±2.0 |
| MAXIMUM ID (mm) | 32.0 | ±2.0 |
| VENT CIRCUMFERENTIAL EXTENT (DEGREES) | 270.0 | ±20.0 |
| OUTLET SECTION | | |
| OUTLET APERTURE DEPTH (mm) | 2.0 | ±.5 |
| OUTLET APERTURE DIAMETER (mm) | 29.0 | ±2.0 |
| TAPER AXIAL HEIGHT (mm) | 7.0 | ±2.0 |
| CYLINDRICAL ANNULAR OD (mm) | 24.0 | ±2.0 |

FIG. 10

| DESIGN | PRESSURE DROP (Pa) | PARTICLE REMOVAL EFFICIENCY | RANGE |
|---|---|---|---|
| NEW | 1312 | 96% | +/- 2.0% |
| BASELINE | 1316 | 91% | +/- 2.0% |

FIG. 11

AIR PRE-CLEANER SPIN TUBE

TECHNICAL FIELD

The present disclosure relates to air pre-cleaner air tube used in engines or the like to move debris, dust, particles, etc. before a pleated filter. Specifically, the present disclosure relates to such air pre-cleaners that remove a higher percentage of particulate than previously known.

BACKGROUND

In order to for an engine to convert chemical energy stored in fuel into mechanical work, the engine utilizes air from the surrounding environment to cause the fuel to combust. However, because the air in the surrounding environment is often laden with debris particles (e.g., dust, sand, or other contaminants, more generally referred to as particulate), which may damage components of the engine and/or cause inefficient combustion, etc., air filter assembles are employed to clean the incoming air.

While pre-cleaner tubes and pleated filters (including those that employ cellulose and the like) are known in the industry. For example, U.S. Pat. No. 4,008,059 discloses a miniature centrifugal separator for use in a n engine air cleaner (e.g., before a fabric or cellulose filter is employed). Two clean air take-off tubes may be provided that are coaxially aligned in the main flow tube for successively removing selected fractions of the outer annular portion of the swirling gas stream. The clean air tube may be spaced pre-selected distances downstream from the swirl means such that entrained dust particles are enabled to complete approximately one swirl revolution prior to encountering each tack-off tube. This patent seeks to accomplish a relatively high collection efficiency with a relatively short flow tube.

However, improved collection efficiency is still desirable over pre-cleaner tubes that are already known in the art.

SUMMARY

An air pre-cleaner spin tube according to an embodiment of the present disclosure may comprise a vaned inlet section including an inlet flange, and an outer tube inlet portion including an outer wall forming a nozzle that defines a radial direction, and a longitudinal axis. Also, a central stem may be disposed in the nozzle, and a plurality of vanes may extend from the central stem to the outer wall.

An air pre-cleaner spin tube according to another embodiment of the present disclosure may comprise a midsection including an outer wall including a first diffuser section defining a first flare angle, and a second diffuser section extending from the first diffuser section defining a second flare angle that is greater than the first flare angle. The outer wall may define a longitudinal axis, a radial direction, and a circumferential direction.

An air pre-cleaner spin tube according to yet another embodiment may comprise an outlet section including in inner tubular base defining a central axis, a radial direction, and having an outlet flange including an outer face. Also, a tapered diffuser section may extend axially from the outlet flange, while a taperless outlet aperture may extend through the outlet flange, defining an outlet aperture diameter and an outlet aperture height measured from the outer face of the outlet flange to the tapered diffuser section. A ratio of the outlet aperture diameter to the outlet aperture height may range from 11.6 to 17.4.

An air pre-cleaner spin tube according to an embodiment of the present disclosure may comprise a vaned inlet section including an inlet flange defining an inlet outer face, an outer tube inlet portion including an outer wall forming a nozzle defining a radial direction and a longitudinal axis, a central stem, as well as a plurality of vanes extending from the central stem to the outer wall. The tube may further comprise a diffuser midsection including at least a first diffuser portion, and an outlet section including in inner tubular base defining a central axis, and a radial direction, and having an outlet flange including an outlet outer face.

BRIEF DESCRIPTION OF THE DRAWINGS

The accompanying drawings, which are incorporated in and constitute a part of this specification, illustrate several embodiments of the disclosure and together with the description, serve to explain the principles of the disclosure. In the drawings:

FIG. 10 contains a table correlating features of the air pre-cleaner spin tube of FIG. 1 with their dimensions.

FIG. 11 contains another table showing improvement over a baseline design of an air pre-cleaner spin tube.

DETAILED DESCRIPTION

Figure 1:
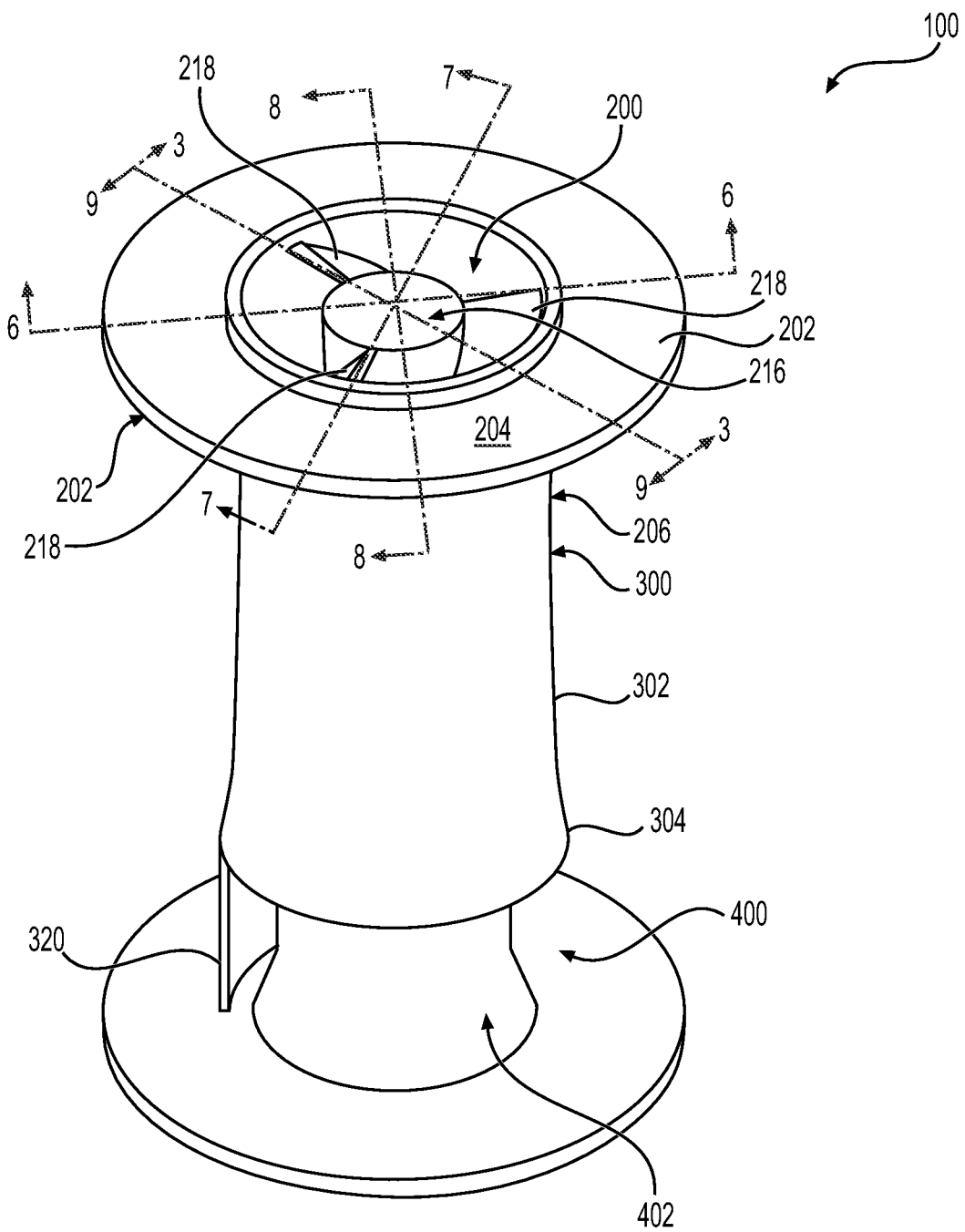
FIG. 1 is a perspective view of an air pre-cleaner spin tube configured according to an embodiment of the present disclosure.

Reference will now be made in detail to embodiments of the disclosure, examples of which are illustrated in the accompanying drawings. Wherever possible, the same reference numbers will be used throughout the drawings to refer to the same or like parts. In some cases, a reference number will be indicated in this specification and the drawings will show the reference number followed by a letter for example, 100a, 100b etc. It is to be understood that the use of letters immediately after a reference number indicates that these features are similarly shaped and have similar function as is often the case when geometry is mirrored about a plane of symmetry. For ease of explanation in this specification, letters will often not be included herein but may be shown in the drawings to indicate duplications of features discussed within this written specification.

Various embodiments of the present disclosure include an air cleaner spin tube described that may achieve an increase in separation efficiency that results in a doubling of select air cleaner group service intervals over a common industry leader in spin tube technology.

Figure 2:
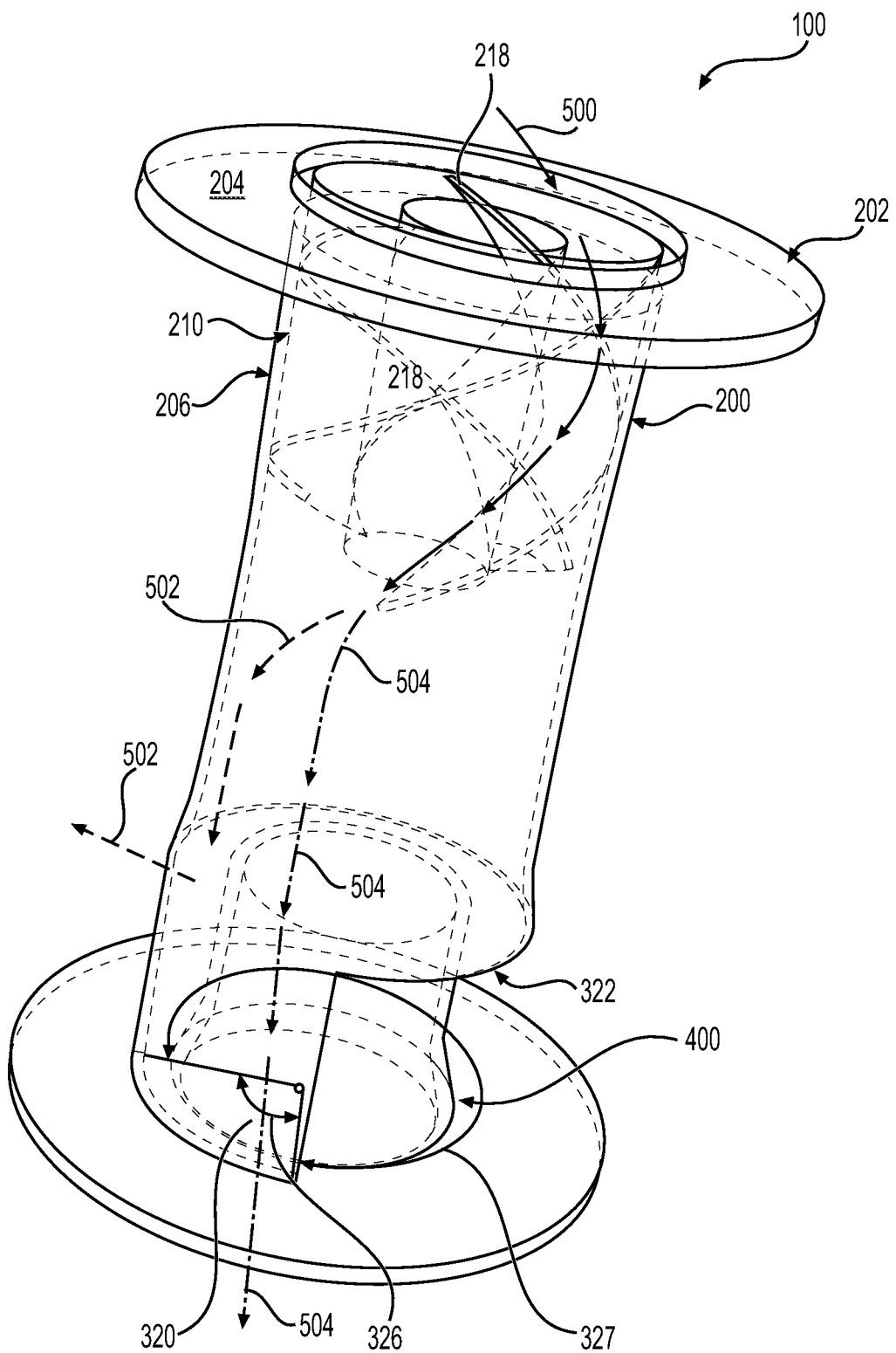
FIG. 2 is an alternate perspective view of the pre-cleaner spin tube of FIG. 1 with hidden features shown in hidden lines.
Figure 3:
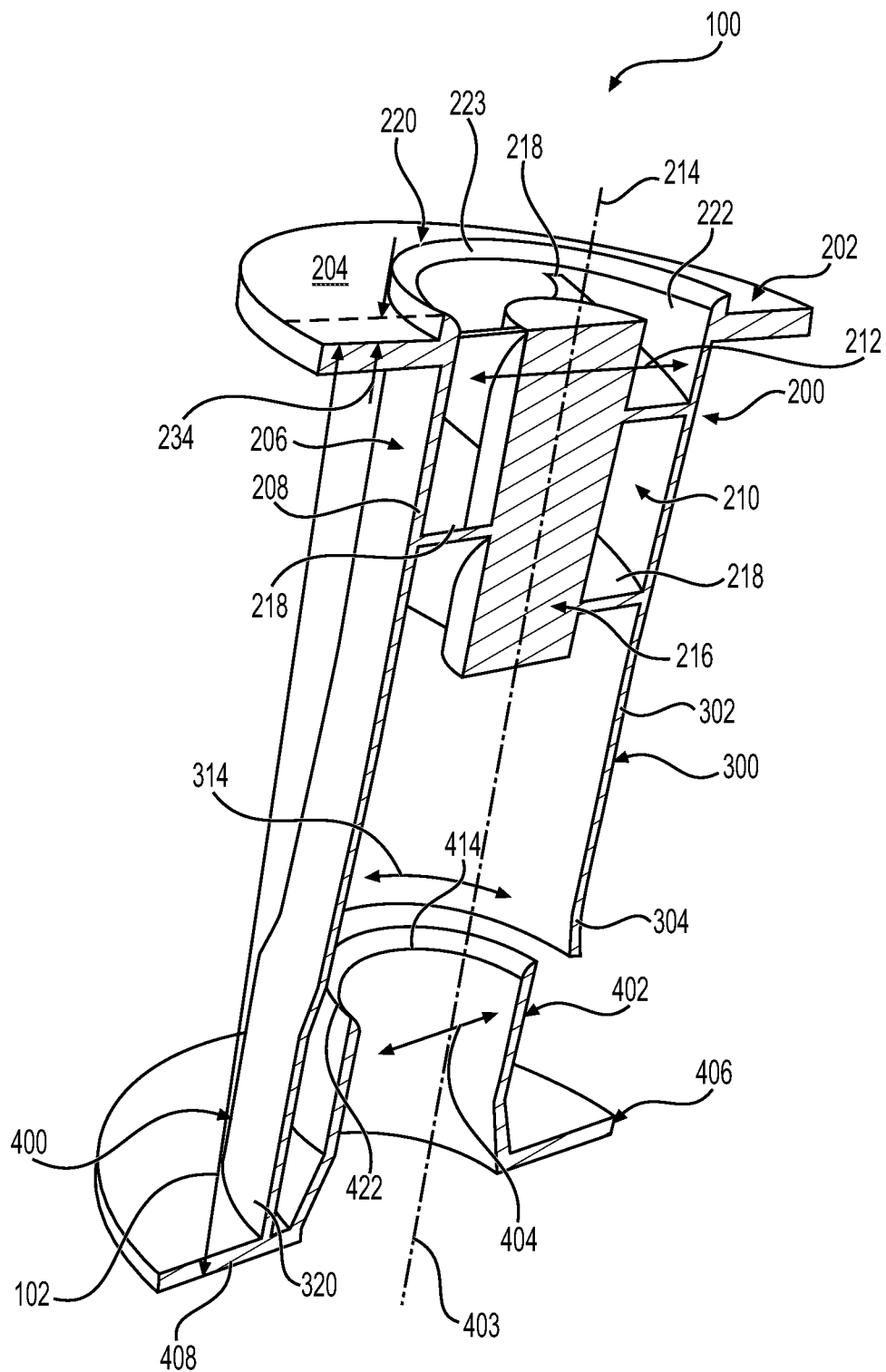
FIG. 3 is a side sectional view of the air pre-cleaner spin tube of FIG. 1 taken along lines 3-3 thereof.

Starting with FIGS. 1 thru 3, an air pre-cleaner spin tube 100 in totality according to an embodiment of the present disclosure may comprise a vaned inlet section 200 including an inlet flange 202 defining an inlet outer face 204, an outer tube inlet portion 206 including an outer wall 208 (see FIG. 3) forming a nozzle 210 defining a radial direction 212, and a longitudinal axis 214.

As best seen in FIG. 3, a central stem 216 may be disposed in the nozzle 210, and a plurality of vanes 218 may extend from the central stem 216 to the outer wall 208. Also, a diffuser midsection 300 may be provided that include at least a first diffuser portion 302, and an outlet section 400 including in inner tubular base 402 that may define a central axis 403 (may be collinear with longitudinal axis 214), and a radial direction 404 (may be parallel with radial direction 212). In addition, the outlet section 400 may further comprise an outlet flange 406 including an outlet outer face 408. Other configurations for these various features may be provided in other embodiments of the present disclosure.

In FIG. 3, the vaned inlet section 200 may further comprise an inlet sleeve 220 (may also be referred to as a lip) extending axially from the inlet outer face 204 away from the outer tube inlet portion 206. In such a case, the inlet sleeve may define an inlet sleeve axial height 234 that ranges from 1.0 mm to 3.0 mm (e.g., the amount the inlet sleeve protrudes axially away from the inlet outer face 204). In some embodiments, this protrusion or lip may be omitted. Also, the inlet sleeve 220 may define an aperture (e.g. inlet aperture 222) that is at least partially formed by a inlet sleeve radius 223 (see also FIG. 7) that may range from 0.9 mm to 1.1 mm in some embodiments of the present disclosure. In some embodiments, the inlet sleeve may not protrude from the inlet flange 202. In such a case, a sleeve radius may or may not be provided.

Furthermore, and the outlet section 400 may include an inner tubular base 402 that has a base exit radius 414 (see also FIG. 7) at its free end that ranges from 0.15 mm to 0.35 mm in some embodiments of the present disclosure. The base exit radius may be omitted in other embodiments of the present disclosure.

Moreover, a face to face axial height 102 may be provided that is measured from the inlet outer face 204 to the outlet outer face 408 that ranges from 87.5 mm to 93.5 mm in some embodiments of the present disclosure. This may not be the case in other embodiments of the present disclosure.

Figure 6:
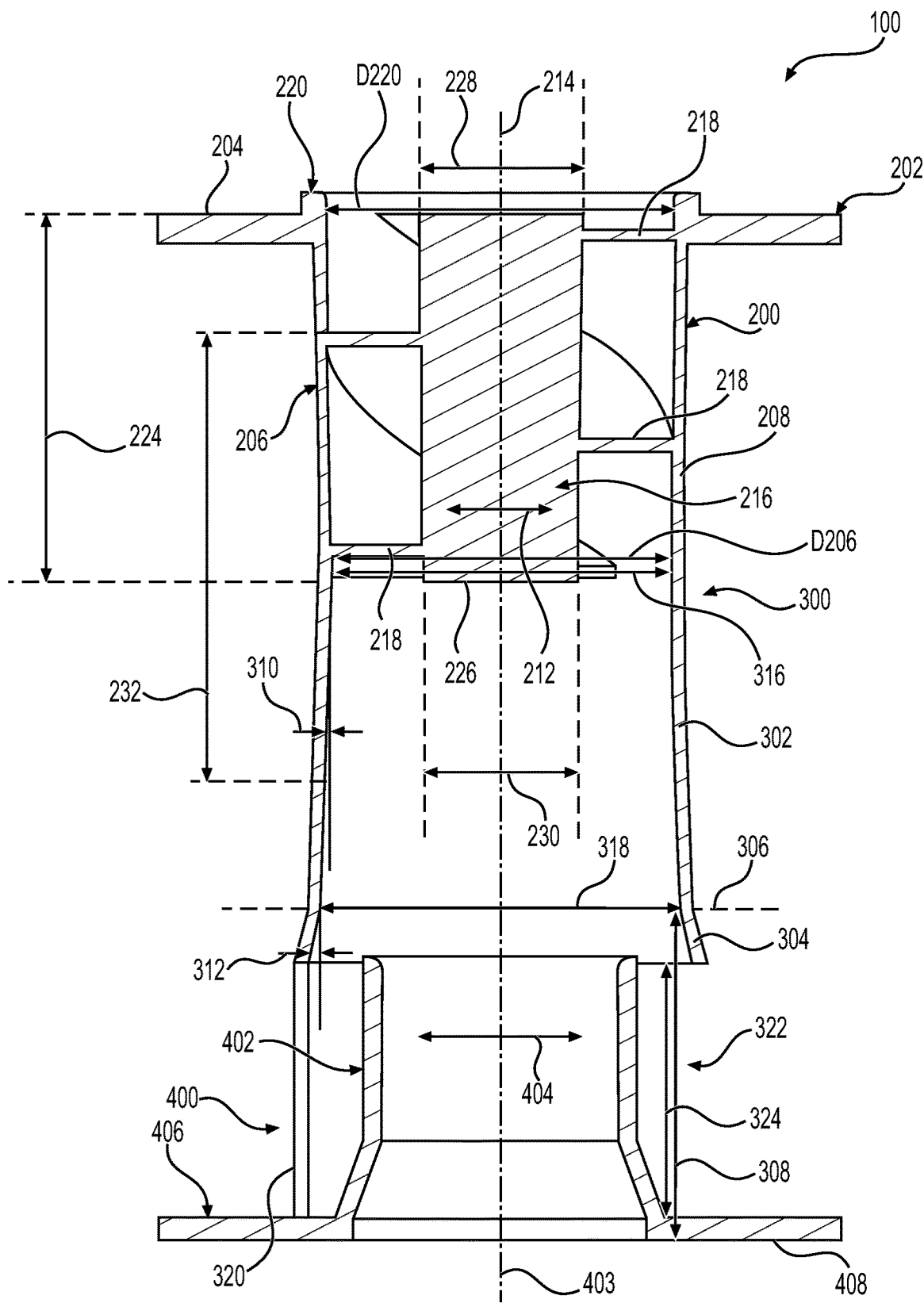
FIG. 6 is another side sectional view of FIG. 3 (see lines 6-6 in FIG. 1).

As best seen in FIG. 6, the diffuser midsection 300 may include a second diffuser portion 304 that flares radially away from the first diffuser portion 302 at point 306 (or plane that is perpendicular to the axes 214, 403 described herein). This point 306 may be disposed a predetermined axial distance 308 from the outlet outer face 408 that ranges 27.0 mm to 31.0 mm in some embodiments of the present disclosure. This may not be the case in other embodiments of the present disclosure.

As air with particulates, dust, debris, etc. enter the tube, the vanes and nozzle may create enough velocity and centrifugal force to force the particulates, etc. to radial outer portions of the tube. When these particulates reach the diffuser midsection, they may slow down so that turbulence does not force them back to the center of the tube. Also, the pressure drop may be decreased by the diffuser midsection. As a result, these particulates may reach the vent and stay radially outside of the radially inner tubular base, enhancing the percentage of debris that is removed without exceeding a desirable amount of pressure drop from the inlet to the outlet of the spin tube.

As shown in FIGS. 1 thru 3, etc. the tube 100 may be formed as unitary body. However, to facilitate manufacturability and serviceability, the tube 100 may be divided into different sections that are nested, attached, etc. to each other. For example, U.S. Pat. No. 4,008,059 (see FIG. 1) illustrates that at least the inlet section and the outlet section may be nested together, being formed of different components.

More specifically, one or more components or portions of the tube 100 may be manufactured using injection molding from a thermoplastic material (e.g., nylon 6/6, etc.). The nominal wall thickness of the tube may range from about 1.5 mm to 2.5 mm (e.g., 2.0 mm) in some embodiments of the present disclosure.

For example, an air pre-cleaner spin tube 100 may comprise a vaned inlet section 200 that is provided as a separate component to aid in manufacturing including an inlet flange 202, an outer tube inlet portion 206 including an outer wall 208 forming a nozzle 210, defining a radial direction 212, and a longitudinal axis 214. A central stem may 216 be disposed in the nozzle 210, and a plurality of vanes 218 may extend or connect the central stem 216 to the outer wall 208 (e.g., the outer radial wall). At least 2 vanes but not more than 4 vanes may be provided in some embodiments of the present disclosure (e.g., 3 vanes may be employed).

Focusing on FIG. 6, the inlet sleeve portion (e.g., see 220) may extend from the inlet flange 202, and may define an inlet inner diameter D220 that may range from 29.0 mm to 33.0 mm in some embodiments of the present disclosure.

In addition, the central stem 216 may extend a stem axial distance 224 (may also be referred to as the vaned tube axial distance) from an outer face 204 of the inlet flange 202, terminating at a free end 226. The stem axial distance 224 may be measured from the outer face 204 of the inlet flange 202 to the free end 226 that ranges from 30.0 mm to 34.0 mm in some embodiments of the present disclosure.

Moreover, the vaned inlet section may define a minimum outer tube inner diameter D206 that ranges from 28.0 mm to 32.0 mm in some embodiments of the present disclosure.

With continued reference to FIG. 6, the plurality of vanes 218 may define a vane pitch 232 that ranges from 50.5 mm to 60.5 mm in some embodiments of the present disclosure. It should be noted that this vane pitch may be theoretical as the actual vanes may not extend a full vane pitch. Also, the central stem 216 may define a stem inlet outer diameter 228 that ranges from 12.5 mm to 16.5.0 mm, as well as a stem outlet outer diameter 230 that ranges from 11.5 mm to 15.5 mm in some embodiments of the present disclosure. In some embodiments, the nozzle 210 is internally defined by the central stem 216.

For example, the draft of the outside of the central stem may match the draft of the inside of the outer wall of outer tube inlet portion. This may not be the case for other embodiments of the present disclosure.

Figure 4:
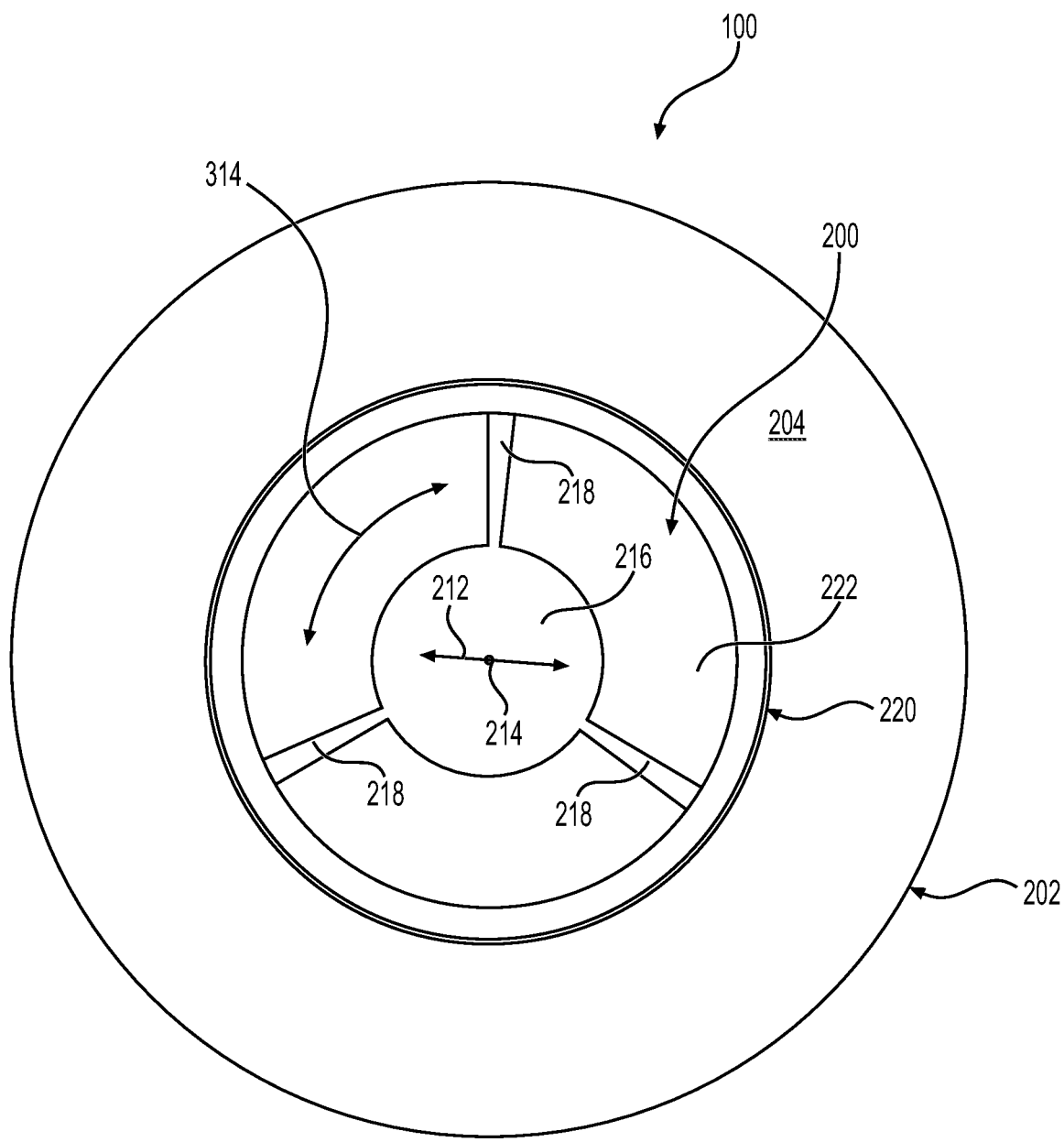
FIG. 4 is a top view of the air pre-cleaner spin tube of FIG. 1.
Figure 5:
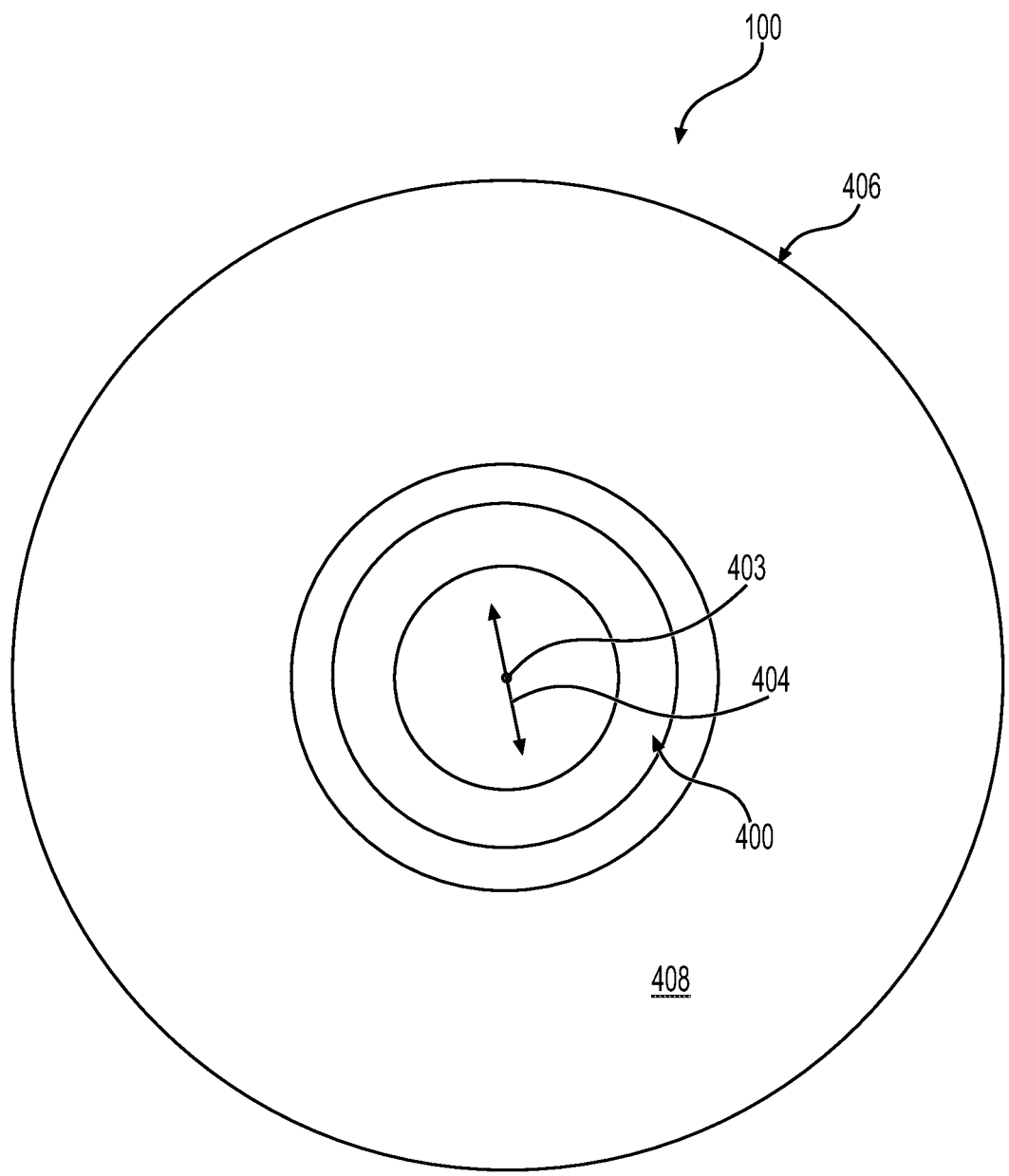
FIG. 5 is a bottom view of the air pre-cleaner spin tube of FIG. 1.

Still referring to FIG. 6, a midsection 300 may be provided that includes an outer wall 208 including a first diffuser section (e.g., see 302) defining a first flare angle 310, and a second diffuser section (e.g., see 304) extending from the first diffuser section (e.g., axially) defining a second flare angle 312 that is greater than the first flare angle 310. The outer wall may also define a circumferential direction 314 (see FIGS. 3 and 4).

Focusing on FIG. 6, the outer wall in the first diffuser section may define a minimum inner diameter 316 that ranges from 28.0 mm to 32.0 mm, and a maximum inner diameter 318 that ranges from 30.0 mm to 34.0 mm in some embodiments of the present disclosure. This may not be the case for other embodiments.

With continued reference to FIG. 6, a portion 320 of the outer wall extends axially downwardly from the second diffuser section (e.g., see 304), forming a vent 322 with a vent axial height 324 that ranges from 20.5 mm to 24.5 mm in some embodiments of the present disclosure. As best seen in FIG. 2, the portion 320 of the outer wall forming the vent 322 may extend circumferentially about the longitudinal axis an angle 326 that may range 70.0 degrees to 110.0 degrees. Put another way, the vent may extend a vent angle 327 ranging from 250.0 degrees to 290.0 degrees (e.g., 270.0 degrees) in some embodiments of the present disclosure.

Figure 7:
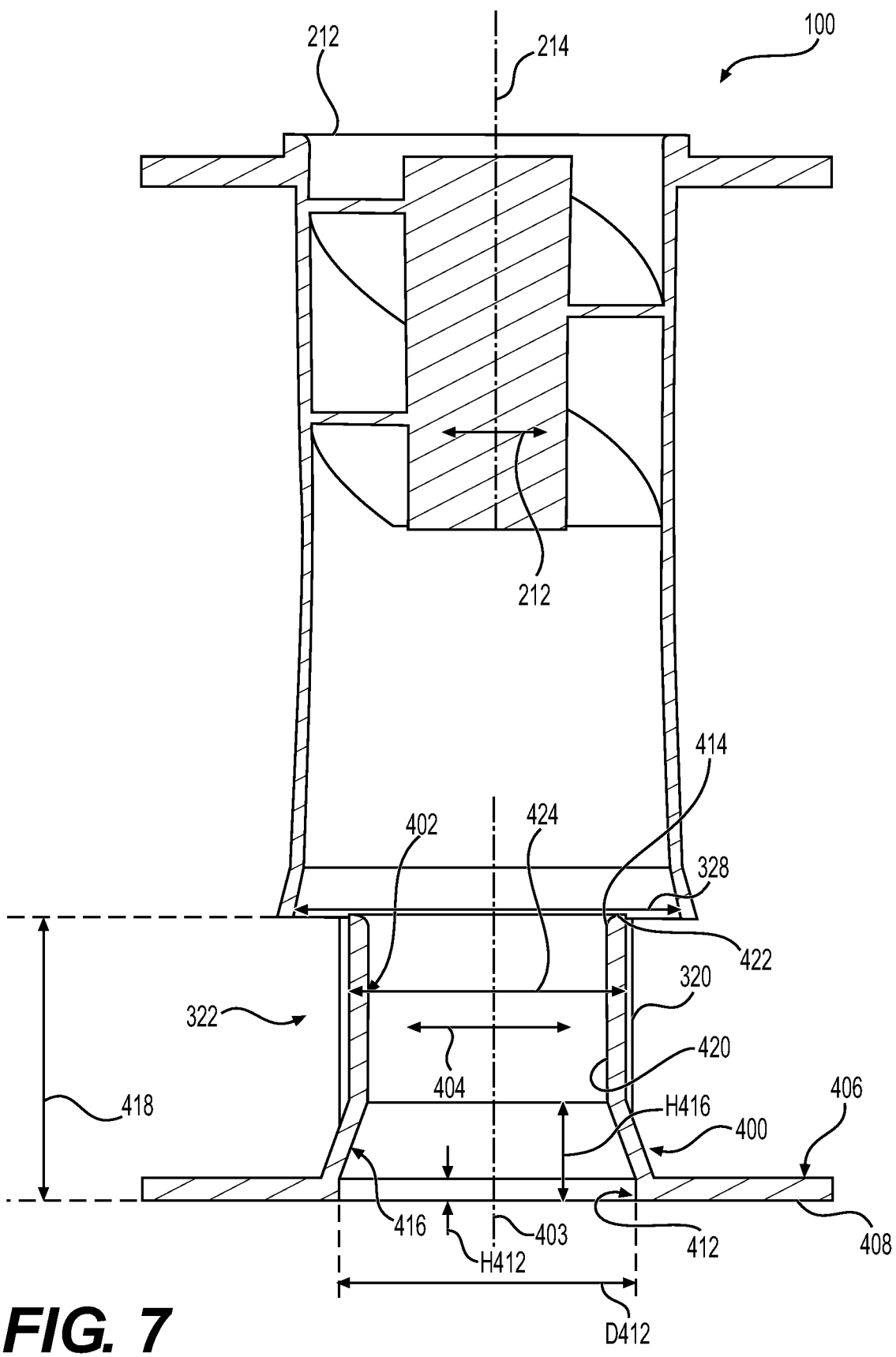
FIG. 7 is a sectional view taken along lines 7-7 of FIG. 1 (angled about 45 degrees to lines 6-6).

In FIG. 7, the outer wall in the second diffuser section defines an outlet inner diameter 328 at its end that ranges from 32.0 mm to 36.0 mm in some embodiments of the present disclosure. Other values are possible in other embodiments.

Likewise, an outlet section 400 or component may be provided that includes in inner tubular base 402 defining a central axis 403 (may be collinear with the longitudinal axis 214 previously described herein), a radial direction 404 (may be parallel to the radial direction 212 previously described herein), and an outlet flange 406 including an outer face (e.g., see 408 that faces axially outwardly). In general terms, all three sections 200, 300, and 400 are concentric with each other, but not necessarily so. Also, the outlet section 400 may have a tapered diffuser section 416 extending axially from the outlet flange 406 toward the middle of the tube 100.

In addition, a taperless outlet aperture 412 (i.e., there is less draft than the flare angles) may extend through the outlet flange 406, defining an outlet aperture diameter D412, and an outlet aperture height H412 measured from the outer face 408 of the outlet flange 406 to the tapered diffuser section 416. In some embodiments, a ratio of the outlet aperture diameter D412 to the outlet aperture height H412 ranges from 11.6 to 17.4. In some embodiments, this may not be the case.

Similarly, the tapered diffuser section extends axially to a cylindrical annular portion 420 (e.g., there is less draft than the flare angles), defining a taper axial height H416 measured from the outlet flange 406 to the cylindrical annular portion 420. A ratio of the outlet aperture diameter D412 to the taper axial height H416 may range from 3.31 to 4.97 in some embodiments of the present disclosure.

In such a case, the outlet aperture diameter D412 may range from 27.0 mm to 31.0 mm, and the outlet aperture height may range from 1.5 mm to 2.5 mm. Also, the taper axial height H416 may range from 5.0 mm to 9.0 mm in some embodiments of the present disclosure.

Still referring to FIG. 7, the inner (e.g., radially inner) tubular base 402 may define a base axial height 418 measured from the outer face (e.g., see 408) of the outlet flange 406 to a free end 422 of the cylindrical annular portion 420. Also, the cylindrical annular portion 420 may define a cylindrical annular outer diameter 424. The base axial height 418 may range from 23.0 mm to 27.0 mm, and the cylindrical annular outer diameter 424 may ranging from 22.0 mm to 26.0 mm in some embodiments of the present disclosure.

Also, the outlet section 400 may further comprise an outer annular portion (e.g., see 320) that at least partially radially surrounds the inner tubular base 402, and the outer annular portion defines an outlet inner diameter 328 that ranges from 32.0 mm to 36.0 mm in some embodiments of the present disclosure.

Again, for any of the embodiments discussed herein, the materials, and features may be modified in configuration, material, or omitted in various embodiments of the present disclosure, etc. For example, the spin tube or its components may be made from sheet metal, or molded from a plastic, etc.

INDUSTRIAL APPLICABILITY

In practice, a spin tube, an inlet section of the spin tube, a midsection of the spin tube, or the outlet section of the spin tube, and/or any component or assembly/combination of these components may be sold, manufactured, bought etc. and in the aftermarket or original equipment manufacturer (OEM) scenarios according to any of the embodiments discussed herein. That is to say, the components, subassembly, and/or assembly may be sold with an engine or a machine using an engine in the OEM (original equipment manufacturer) or aftermarket contexts.

In use, a technician may service or replace the spin tube as a whole or as separate components as alluded to earlier herein.

The inventors of the present disclosure have performed a CFD analysis (computational fluid dynamics) on the spin tube using various boundary conditions and design constraints.

For example, a pressure boundary of 1 atm was set at the inlet of the spin tube, an assumption of symmetry was employed in the model, and an volumetric air flow of 0.648 $m^3$ was set at the outlet of tube. The particles were seeded at the pressure boundary, and the particle velocity was assumed to be the same as the local fluid velocity. Particles were grouped according to a particle size distribution table. The mass flow of each size of the particle was calculated using the particle volume fraction distribution in the table. Also, one way coupling for LPT (Lagragian particle tracking assuming small particle mass fraction) was also modeled. Gravitational effects were neglected.

CFD calculations for 500 scenarios were then evaluated, then the "New" design was chosen as meeting the desired performance criteria. Specifically as shown by the table of FIG. 11, the desired maximum pressure drop of 1312 Pa was not exceeded, and the particle removal efficiency was increased by 5.0% or more as compared to the baseline spin tube design.

Figure 8:
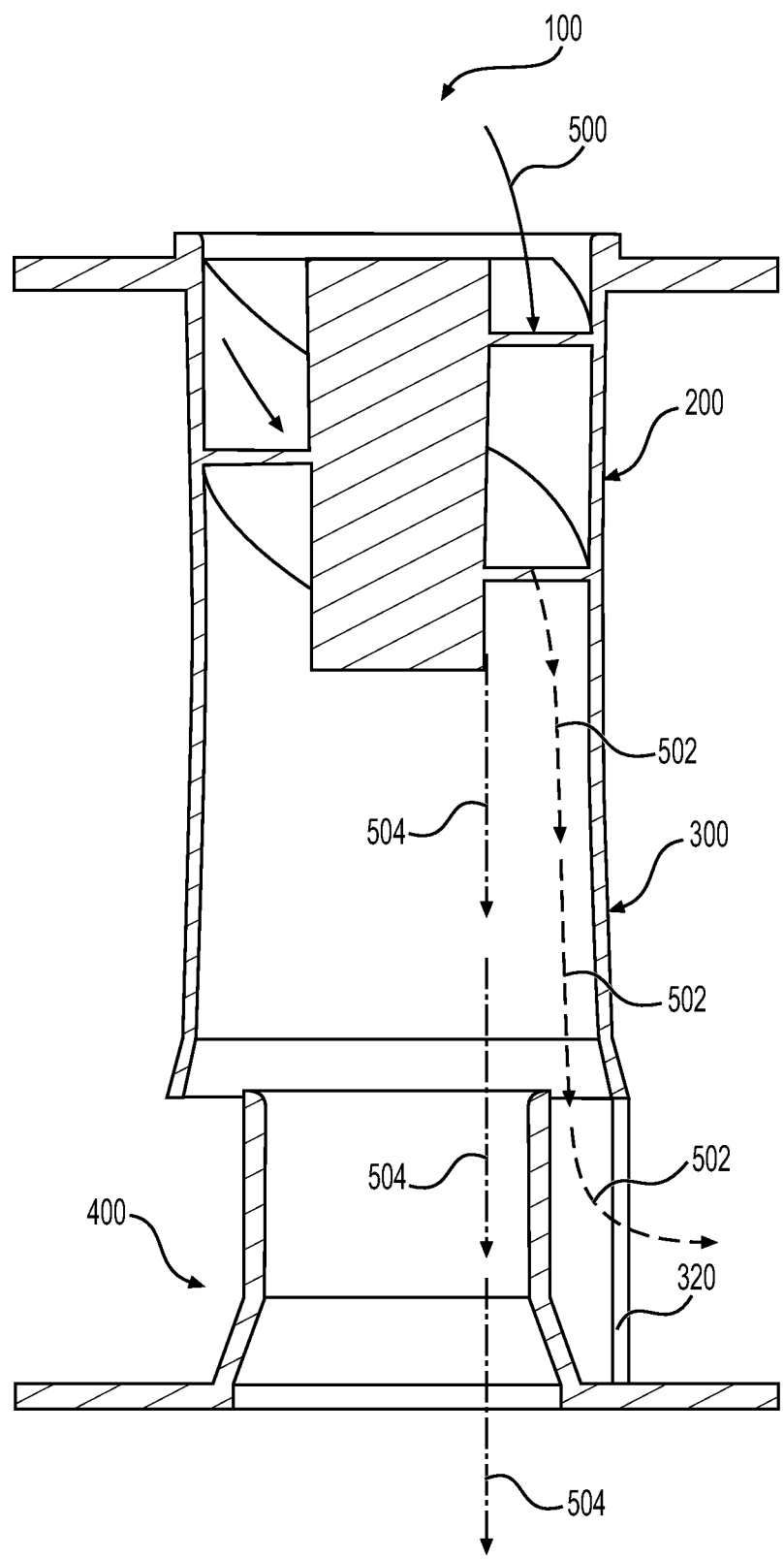
FIG. 8 is a sectional view taken along lines 8-8 of FIG. 1 (angled about 45 degrees orthogonal to lines 7-7).
Figure 9:
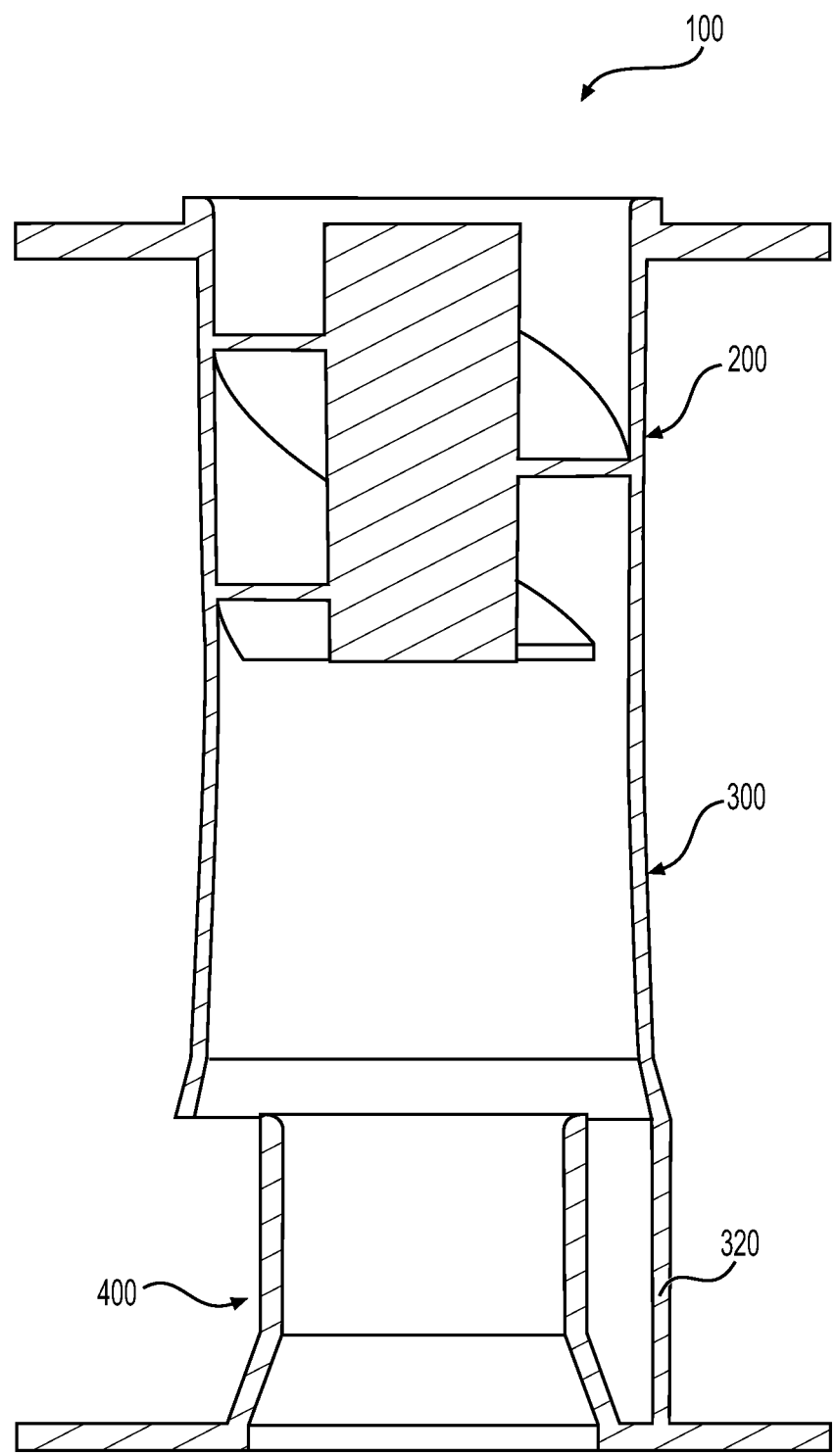
FIG. 9 is a sectional view taken along lines 9-9 of FIG. 1 (angled about 45 degrees orthogonal to lines 8-8).

Surprisingly, the inventors found that the nozzle in conjunction with the stationary vanes caused the incoming air (see arrows 500 in FIGS. 2 and 7) to spin more rapidly, leading to a larger centrifugal force that spun out dust and dirt toward the outer wall(s) (see arrows 502 in FIGS. 2 and 8). The diffuser midsection unexpectedly slowed down the air, reducing pressure drop and allowing the dust and dirt to still be removed with scavenged air flow out the vent. This win-win scenario (design tradeoff was broken) may be attributed to the decrease in air flow turbulence near the outer wall as scavenging takes place. Clear air (see arrows 504 in FIGS. 2 and 7) was free to continue on through the spin tube to the primary air cleaner (e.g. such as a filter with pleated filter media or the like), or to the engine, or other apparatus as desired.

As used herein, the articles "a" and "an" are intended to include one or more items, and may be used interchangeably with "one or more." Where only one item is intended, the term "one" or similar language is used. Also, as used herein, the terms "has", "have", "having", "with" or the like are intended to be open-ended terms. Further, the phrase "based on" is intended to mean "based, at least in part, on" unless explicitly stated otherwise.

It will be apparent to those skilled in the art that various modifications and variations can be made to the embodiments of the apparatus and methods of assembly as discussed herein without departing from the scope or spirit of the invention(s). Other embodiments of this disclosure will be apparent to those skilled in the art from consideration of the specification and practice of the various embodiments disclosed herein. For example, some of the equipment may be constructed and function differently than what has been described herein and certain steps of any method may be omitted, performed in an order that is different than what has been specifically mentioned or in some cases performed simultaneously or in sub-steps. Furthermore, variations or modifications to certain aspects or features of various embodiments may be made to create further embodiments and features and aspects of various embodiments may be added to or substituted for other features or aspects of other embodiments in order to provide still further embodiments.

Accordingly, it is intended that the specification and examples be considered as exemplary only, with a true scope and spirit of the invention(s) being indicated by the following claims and their equivalents.

What is claimed is:

1. An air pre-cleaner spin tube comprising:
   a vaned inlet section including:
      an inlet flange;
      an outer tube inlet portion including an outer wall forming a nozzle defining a radial direction and a longitudinal axis;
      a central stem disposed in the nozzle; and
      a plurality of vanes extending from the central stem to the outer wall;
   a diffuser midsection; and
   an outlet section including:
      a portion of an outer wall,
      a cylindrical annular portion, and
      a tapered diffuser section that extends axially from an outlet flange toward the cylindrical annular portion,
         wherein the cylindrical annular portion extends axially from the tapered diffuser section to an area within a section, of the diffuser midsection, that defines a flare angle and extends to the portion of the outer wall, and
         wherein a taper axial height of the tapered diffuser section is less than a height of the cylindrical annular portion.

2. The air pre-cleaner spin tube of claim 1, wherein the plurality of vanes includes at least 2 vanes but not more than 4 vanes.

3. The air pre-cleaner spin tube of claim 2, wherein the plurality of vanes includes 3 vanes.

4. The air pre-cleaner spin tube of claim 1, further comprising an inlet sleeve portion that extends from the inlet flange and defines an inlet inner diameter that ranges from 29.0 mm to 33.0 mm.

5. The air pre-cleaner spin tube of claim 1, wherein the central stem extends from an outer face of the inlet flange, terminating at a free end, and defines a vaned tube axial distance measured from the outer face of the inlet flange to the free end that ranges from 30.0 mm to 34.0 mm.

6. The air pre-cleaner spin tube of claim 1, wherein the vaned inlet section defines a minimum outer tube inner diameter that ranges from 28.0 mm to 32.0 mm.

7. The air pre-cleaner spin tube of claim 1, wherein the plurality of vanes define a vane pitch that ranges from 50.5 mm to 60.5 mm, and
   wherein the central stem defines:
      a stem inlet outer diameter that ranges from 12.5 mm to 16.5.0 mm, and
      a stem outlet outer diameter that ranges from 11.5 mm to 15.5 mm such that the nozzle is internally defined by the central stem.

8. An air pre-cleaner spin tube comprising:
   a midsection including:
      a first diffuser section defining a first flare angle, and
      a second diffuser section extending from the first diffuser section and defining a second flare angle that is greater than the first flare angle; and
   an outlet section including:
      a portion of an outer wall,
      a cylindrical annular portion, and
      a tapered diffuser section that extends axially from an outlet flange toward the cylindrical annular portion,
         wherein the cylindrical annular portion extends axially from the tapered diffuser section to an area within the second diffuser section,
         wherein the second diffuser section extends to the portion of the outer wall, and
         wherein a taper axial height of the tapered diffuser section is less than a height of the cylindrical annular portion.

9. The air pre-cleaner spin tube of claim 8, wherein the first diffuser section defines a minimum inner diameter that ranges from 28.0 mm to 32.0 mm and a maximum inner diameter that ranges from 30.0 mm to 34.0 mm.

10. The air pre-cleaner spin tube of claim 8, wherein the portion of the outer wall extends axially downwardly from the second diffuser section, forming a vent with a vent axial height that ranges from 20.5 mm to 24.5 mm.

11. The air pre-cleaner spin tube of claim 10, wherein the portion of the outer wall forming the vent extends circumferentially about a longitudinal axis of the outer wall at an angle that ranges from 70.0 degrees to 110.0 degrees.

12. The air pre-cleaner spin tube of claim 8, wherein the second diffuser section defines an outlet inner diameter that ranges from 32.0 mm to 36.0 mm.

13. An air pre-cleaner spin tube comprising:
   a diffuser midsection; and
   an outlet section including:
      a portion of an outer wall,
      an outlet flange including an outer face,
      a cylindrical annular portion, and
      a tapered diffuser section extending axially from the outlet flange and toward the cylindrical annular portion,
         wherein the cylindrical annular portion extends axially from the tapered diffuser section to an area within a section, of the diffuser midsection, that defines a flare angle and extends to the portion of the outer wall, and
         wherein a taper axial height of the tapered diffuser section is less than a height of the cylindrical annular portion.

14. The air pre-cleaner spin tube of claim 13,
   wherein the outlet section further includes:
      a taperless outlet aperture extending through the outlet flange and defining an outlet aperture diameter,
   wherein the taper axial height is measured from the outlet flange to the cylindrical annular portion, and
   wherein a ratio of the outlet aperture diameter to the taper axial height ranges from 3.31 to 4.97.

15. The air pre-cleaner spin tube of claim 13,
   wherein the outlet section further includes:
      a taperless outlet aperture extending through the outlet flange and defining an outlet aperture diameter and an outlet aperture height, wherein the outlet aperture diameter ranges from 27.0 mm to 31.0 mm,
wherein the outlet aperture height ranges from 1.5 mm to 2.5 mm, and
wherein the taper axial height ranges from 5.0 mm to 9.0 mm.

16. The air pre-cleaner spin tube of claim 13,
wherein the outlet section further includes an inner tubular base,
wherein the inner tubular base defines a base axial height measured from the outer face to a free end of the cylindrical annular portion,
wherein the cylindrical annular portion defines a cylindrical annular outer diameter,
wherein the base axial height ranges from 23.0 mm to 27.0 mm, and
wherein the cylindrical annular outer diameter ranges from 22.0 mm to 26.0 mm.

17. The air pre-cleaner spin tube of claim 16,
wherein the portion of the outer wall is an outer annular portion that at least partially radially surrounds the inner tubular base, and
wherein the outer annular portion defines an outlet inner diameter that ranges from 32.0 mm to 36.0 mm.

18. A tube comprising:
a vaned inlet section;
a diffuser midsection; and
an outlet section including:
    a portion of an outer wall,
    a cylindrical annular portion, and
    a tapered diffuser section that extends axially from an outlet flange toward the cylindrical annular portion,
        wherein the cylindrical annular portion extends axially from the tapered diffuser section to an area within a diffuser portion, of the diffuser midsection, that defines a flare angle and extends to the portion of the outer wall, and
        wherein a taper axial height of the tapered diffuser section is less than a height of the cylindrical annular portion.

19. The tube of claim 18, further comprising:
an inlet sleeve extending axially from an inlet outer face that is defined by an inlet flange of the vaned inlet section,
    wherein the inlet sleeve defines:
        an inlet sleeve axial height that ranges from 1.0 mm to 3.0 mm, and
        an aperture at least partially formed by an inlet sleeve radius that ranges from 0.9 mm to 1.1 mm, and
    wherein the outlet section further includes an inner tubular base that defines an exit aperture at a free end of the inner tubular base that is at least partially formed by a base exit radius that ranges from 0.15 mm to 0.35 mm.

20. The tube of claim 18,
wherein the vane inlet section includes an inlet flange having an inlet outer face,
wherein the outlet flange has an outlet outer face,
wherein a face to face axial height is measured from the inlet outer face to the outlet outer face that ranges from 87.5 mm to 93.5 mm,
wherein the diffuser midsection further includes: a first diffuser portion, and
wherein the diffuser portion is a second diffuser portion that flares radially away from the first diffuser portion at a point that is disposed a predetermined axial distance from the outlet outer face.

\* \* \* \* \*